US008662508B2

(12) United States Patent
Grossman

(10) Patent No.: US 8,662,508 B2
(45) Date of Patent: Mar. 4, 2014

(54) SCOOTER

(75) Inventor: Martin Grossman, Glasgow (GB)

(73) Assignee: H Grossman Limited, Glasgow (GB)

(*) Notice: Subject to any disclaimer, the term of this patent is extended or adjusted under 35 U.S.C. 154(b) by 544 days.

(21) Appl. No.: 11/338,901

(22) Filed: Jan. 25, 2006

(65) Prior Publication Data

US 2006/0175784 A1    Aug. 10, 2006

Related U.S. Application Data

(63) Continuation-in-part of application No. 11/122,529, filed on May 5, 2005, now Pat. No. 7,712,937.

(30) Foreign Application Priority Data

May 5, 2004 (GB) .................................. 0409974.3
Jan. 26, 2005 (GB) .................................. 0501600.1

(51) Int. Cl.
*A63C 17/26* (2006.01)
(52) U.S. Cl.
CPC ..................................... *A63C 17/26* (2013.01)
USPC .................................. 280/87.041; 280/11.203
(58) Field of Classification Search
USPC .......... 446/438; 362/276, 473, 321, 800, 802, 362/806, 545, 543, 544, 548, 549; 280/11.203, 11.204, 11.214, 11.217, 280/200, 87.041, 87.042, 87.05, 47.131, 280/47.17
See application file for complete search history.

(56) References Cited

U.S. PATENT DOCUMENTS

| 4,328,274 | A | * | 5/1982 | Tarbutton et al. | 428/149 |
| 4,337,963 | A | * | 7/1982 | Stevenson | 280/87.042 |
| 4,395,263 | A | * | 7/1983 | Davis | 8/471 |
| 4,544,993 | A |   | 10/1985 | Kirk | 362/153 |
| 4,856,364 | A | * | 8/1989 | Dixon | 74/551.8 |
| 4,991,066 | A | * | 2/1991 | McCowan | 362/464 |
| 4,997,196 | A | * | 3/1991 | Wood | 280/87.042 |
| 5,004,256 | A | * | 4/1991 | Won | 280/87.042 |
| 5,029,661 | A | * | 7/1991 | Wallace et al. | 180/165 |

(Continued)

FOREIGN PATENT DOCUMENTS

DE     20101316     5/2001
DE     20107388     8/2001

(Continued)

OTHER PUBLICATIONS

"Search Report under Section 17" for U.K. App. No. GB0600356.0 dated Apr. 13, 2006.

(Continued)

*Primary Examiner* — Hau Phan
*Assistant Examiner* — Jacob Meyer
(74) *Attorney, Agent, or Firm* — Tarolli, Sundheim, Covell & Tummino LLP

(57) ABSTRACT

An improved scooter incorporates a novel or novelty illumination or lighting effect. Scooters have undergone an upsurge in popularity in recent years, e.g. because of innovation such as folding scooters and micro-scooters. There is provided a scooter or other self or foot propelled vehicle or the like having a platform for supporting a user, the platform having an upper surface having illumination. The platform comprises a foot-plate, and is at least part transparent or translucent. The platform comprises a first portion extruded from metal and a second portion, which is at least part transparent or translucent, and preferably made from a plastics material.

73 Claims, 9 Drawing Sheets

(56) References Cited

U.S. PATENT DOCUMENTS

| | | | | |
|---|---|---|---|---|
| 5,067,058 | A * | 11/1991 | Standley | 362/459 |
| 5,095,412 | A * | 3/1992 | French | 362/153 |
| 5,119,277 | A * | 6/1992 | Copley et al. | 362/543 |
| 5,132,883 | A * | 7/1992 | La Lumandier | 362/466 |
| 5,292,141 | A * | 3/1994 | Ekedal et al. | 280/87.042 |
| 5,513,080 | A * | 4/1996 | Magle et al. | 362/103 |
| 5,588,734 | A | 12/1996 | Talamo et al. | 362/61 |
| 5,590,908 | A * | 1/1997 | Carr | 280/809 |
| 5,746,499 | A * | 5/1998 | Ratcliffe et al. | 362/103 |
| 5,907,321 | A * | 5/1999 | Grossman et al. | 725/32 |
| 6,000,721 | A * | 12/1999 | Pfaeffle | 280/809 |
| 6,050,357 | A * | 4/2000 | Staelin et al. | 180/65.1 |
| 6,056,420 | A * | 5/2000 | Wilson et al. | 362/249.03 |
| 6,123,443 | A | 9/2000 | Conway | 362/576 |
| 6,199,880 | B1 * | 3/2001 | Favorito et al. | 280/87.042 |
| 6,260,866 | B1 | 7/2001 | Cheng | |
| 6,273,440 | B1 * | 8/2001 | Wilson | 280/87.042 |
| 6,293,571 | B1 * | 9/2001 | Wen | 280/87.042 |
| 6,354,714 | B1 * | 3/2002 | Rhodes | 362/153.1 |
| 6,431,302 | B2 * | 8/2002 | Patmont et al. | 180/228 |
| 6,431,733 | B2 * | 8/2002 | Seifert et al. | 362/459 |
| 6,435,529 | B1 * | 8/2002 | Stewart et al. | 280/87.041 |
| 6,443,470 | B1 * | 9/2002 | Ulrich et al. | 280/87.041 |
| 6,443,590 | B1 * | 9/2002 | Lovitt | 362/103 |
| 6,533,438 | B2 * | 3/2003 | Ter-Hovhannisian | 362/276 |
| 6,619,679 | B2 * | 9/2003 | Lan | 280/87.05 |
| 6,621,419 | B2 * | 9/2003 | Chiu | 340/815.42 |
| 6,646,547 | B2 * | 11/2003 | Chiu | 340/321 |
| 6,802,636 | B1 * | 10/2004 | Bailey, Jr. | 362/555 |
| 6,828,916 | B2 * | 12/2004 | Rains et al. | 340/665 |
| 6,854,748 | B2 * | 2/2005 | Wimbish et al. | 280/87.042 |
| 7,048,284 | B1 * | 5/2006 | Seifert | 280/79.11 |
| 7,232,243 | B1 * | 6/2007 | Nassif | 362/459 |
| 7,311,164 | B1 * | 12/2007 | Kertes | 180/180 |
| 7,347,431 | B2 * | 3/2008 | Hill et al. | 280/87.042 |
| 7,445,218 | B2 * | 11/2008 | Esposito et al. | 280/87.042 |
| 7,458,435 | B2 * | 12/2008 | Negoro et al. | 180/180 |
| 7,468,677 | B2 * | 12/2008 | Pederson et al. | 340/815.45 |
| D588,204 | S * | 3/2009 | Grossman | D21/423 |
| 7,712,937 | B2 * | 5/2010 | Grossman | 362/545 |
| 2002/0000339 | A1 * | 1/2002 | Tsai | 180/65.1 |
| 2002/0018345 | A1 * | 2/2002 | Seifert et al. | 362/459 |
| 2002/0030339 | A1 | 3/2002 | Powers | |
| 2002/0074756 | A1 * | 6/2002 | Tsai | 280/87.041 |
| 2002/0093161 | A1 * | 7/2002 | Udwin et al. | 280/87.05 |
| 2002/0096855 | A1 * | 7/2002 | Lee | 280/244 |
| 2002/0105157 | A1 * | 8/2002 | Chen | 280/87.041 |
| 2002/0105158 | A1 * | 8/2002 | Stewart et al. | 280/87.041 |
| 2002/0121756 | A1 * | 9/2002 | Chen et al. | 280/87.041 |
| 2002/0135464 | A1 * | 9/2002 | Chiu | 340/321 |
| 2002/0135998 | A1 | 9/2002 | Chiu | 362/103 |
| 2002/0140194 | A1 * | 10/2002 | Shaw | 280/87.041 |
| 2002/0167415 | A1 * | 11/2002 | Rains et al. | 340/665 |
| 2003/0007352 | A1 * | 1/2003 | Ter-Hovhannisian | 362/276 |
| 2003/0034622 | A1 * | 2/2003 | van Ardenne | 280/87.05 |
| 2003/0048641 | A1 * | 3/2003 | Alexanderson et al. | 362/470 |
| 2003/0052556 | A1 * | 3/2003 | Chen | 310/67 R |
| 2003/0185019 | A1 * | 10/2003 | Rogers et al. | 362/545 |
| 2003/0201620 | A1 * | 10/2003 | Seelye | 280/87.042 |
| 2003/0206097 | A1 * | 11/2003 | Aceves | 340/432 |
| 2003/0223247 | A1 * | 12/2003 | Karras | 362/555 |
| 2004/0026883 | A1 | 2/2004 | Chen | 280/87.041 |
| 2004/0100054 | A1 * | 5/2004 | Yang | 280/87.042 |
| 2004/0100055 | A1 * | 5/2004 | Chang | 280/87.042 |
| 2004/0257831 | A1 * | 12/2004 | Liao | 362/565 |
| 2005/0029767 | A1 * | 2/2005 | Chang | 280/87.042 |
| 2005/0157495 | A1 * | 7/2005 | Bruck | 362/240 |
| 2005/0161932 | A1 * | 7/2005 | Yun-Ki | 280/809 |
| 2005/0162844 | A1 * | 7/2005 | Yun-Ki | 362/34 |
| 2005/0231949 | A1 * | 10/2005 | Kim et al. | 362/249 |
| 2005/0248957 | A1 * | 11/2005 | Grossman | 362/545 |
| 2006/0001227 | A1 * | 1/2006 | Hong | 280/87.041 |
| 2006/0044796 | A1 * | 3/2006 | Wang et al. | 362/249 |
| 2006/0049595 | A1 * | 3/2006 | Crigler et al. | 280/87.042 |
| 2006/0049596 | A1 * | 3/2006 | Hill et al. | 280/87.042 |
| 2006/0083012 | A1 | 4/2006 | Ter-Hovhannissian | 362/485 |
| 2006/0103098 | A1 * | 5/2006 | Esposito et al. | 280/87.042 |
| 2006/0126354 | A1 * | 6/2006 | Fu | 362/545 |
| 2007/0194558 | A1 * | 8/2007 | Stone et al. | 280/601 |
| 2007/0263401 | A1 * | 11/2007 | Shi | 362/501 |
| 2008/0036165 | A1 * | 2/2008 | Reinson | 280/87.042 |
| 2009/0010021 | A1 * | 1/2009 | Smith et al. | 362/565 |
| 2009/0066073 | A1 * | 3/2009 | Kawano et al. | 280/816 |
| 2009/0067187 | A1 * | 3/2009 | Jaime, Sr. | 362/544 |
| 2009/0236841 | A1 * | 9/2009 | Borges | 280/816 |
| 2010/0140894 | A1 * | 6/2010 | Grossman | 280/87.041 |
| 2011/0031711 | A1 * | 2/2011 | Grossman | 280/87.041 |

FOREIGN PATENT DOCUMENTS

| | | |
|---|---|---|
| DE | 200 18 683 U1 | 9/2001 |
| DE | 203 02 674 U1 | 7/2003 |
| DE | 203 11 094 UI | 2/2004 |
| EM | 000146352-0001 | 8/2004 |
| EM | 000146352-0002 | 8/2004 |
| EP | 1174335 | 7/2001 |
| EP | 1 593 590 A1 | 11/2005 |
| GB | 2360984 | 10/2001 |
| GB | 2 368 323 A | 5/2002 |
| GB | 2 381 503 A | 5/2003 |
| GB | 2381503 | 5/2003 |
| GB | 2 397 808 A | 8/2004 |
| GB | 2 404 435 A | 2/2005 |
| JP | 2003-265673 | 9/2003 |
| WO | 9846474 | 10/1998 |

OTHER PUBLICATIONS

"Further Search Report under Section 17" for U.K. App. No. GB0600356.0 dated Apr. 29, 2008.

Razor® Products web pages from http://www.razor.com/products/a-scooter.php ( 12 pages including The Original Razor® 'A' Folding Scooter—Blue, Clear, Green, Pink, and Red).

* cited by examiner

SCOOTER

CROSS-REFERENCE TO RELATED APPLICATIONS

This application claims priority to United Kingdom patent application no. 05 01 600.1 filed Jan. 26, 2005, and the entire contents of this application are expressly incorporated herein by reference thereto. This application also is a continuation-in-part of U.S. patent application Ser. No. 11/122,529 filed May 5, 2005 now U.S. Pat. No. 7,712,937, which claims priority to United Kingdom patent application no. 04 09 974.3 filed May 5, 2004.

FIELD OF THE INVENTION

The present invention relates to an improved scooter or similar type of self/foot propelled transport means. The invention particularly, but not exclusively, relates to a scooter or the like incorporating a novel or novelty illumination or lighting effect.

BACKGROUND OF THE INVENTION

Scooters have undergone an upsurge in popularity in recent years, e.g. because of innovations such as folding scooters or "micro-scooters."

There exists a need for an improved scooter incorporating a novel or novelty lighting effect.

SUMMARY OF THE INVENTION

According to a first aspect of the present invention there is provided a scooter or other self or foot propelled vehicle or the like having a platform for supporting a user, the platform having an upper surface having illumination means.

The illumination means may comprise or incorporate a novelty lighting effect.

The platform may comprise a foot-plate.

Provision of an illumination means or novelty lighting effect on the upper surface of a scooter may, when illuminated, make the scooter more visible to onlookers and/or passers-by and/or to a user. Making a scooter more visible can assist in avoiding and/or reducing accidents involving scooters, and/or can provide an additional visual effect such as a novelty visual effect, e.g. when the rider is performing stunts or manoeuvres.

Preferably, the platform is at least part transparent or translucent.

According to a second aspect of the present invention there is provided a scooter or other self or foot propelled vehicle or the like having a platform for supporting a user, the platform being at least part transparent or translucent.

Provision of an at least part transparent or translucent platform permits effects, such as novelty lighting effects, to be incorporated within or adjacent to the platform whilst still being visible.

Preferably, the platform has an upper surface having illumination means.

The platform may comprise a foot-plate.

Concerning either the first or second aspects, preferably, the scooter or self-propelled vehicle is a scooter.

Most preferably, the scooter is a so-called "micro-scooter."

Preferably, the scooter or micro-scooter is collapsible.

Alternatively, the scooter or self-propelled vehicle may be a skateboard, e.g. a training skateboard provided with a handle, which handle may be collapsible.

Preferably, at least part of the platform is extruded from metal.

Advantageously, alternatively or additionally, at least part of the platform comprises a polymeric or plastics material. Where a part portion of the platform comprises a polymeric or plastics material preferably, the plastics material may be a thermoplastic such as ABS. A thermoplastic platform, such as ABS, is suitable for high volume moulding processes such as injection moulding.

Using injection moulding to manufacture a polymeric or plastics platform or extrusion to manufacture a metal platform allows part of the platform to be manufactured as a unitary component, thereby potentially increasing the strength of the platform and reducing the cost of manufacture of a platform. Where metal is used the metal may be substantially aluminium or an alloy thereof.

Most preferably, the platform comprises a first portion, e.g. extruded from metal, and a second portion, e.g. which is at least part transparent or translucent, and preferably made from a plastics material.

The platform may further include end caps. The end caps may be used to secure the first and second portions together.

Preferably, the illumination means are provided below, adjacent or within the platform. In use, light passes through the transparent or translucent part of the platform and/or passes through and/or reflects off inner surfaces, e.g. sidewalls thereof. The illumination means may therefore provide a pseudo "disco" floor effect.

Preferably, the transparent or translucent part of the platform permits light from the illumination means to pass through at least part of a top surface of the platform.

The transparent or translucent part of the platform may be translucent. Alternatively, the transparent or translucent part of the platform may be transparent. Where the transparent or translucent part of the platform is translucent, this may give rise to a "milky" effect. A "milky" effect diffuses the light effect created by the illumination means.

Preferably, the illumination means is provided by at least one and preferably a plurality of light sources, e.g. light emitting diodes (LEDs). LEDs are preferred as LEDs use relatively low levels of power whilst providing a desired visual effect.

The illumination means may be provided in a plurality of different colours. Preferably, the illumination means are selected from one or more of the following colours: red, blue, green, yellow, white, purple, pink, gold, turquoise, orange.

Most preferably, the LEDs are surface mounted display LEDs. Where surface mounted display LEDs are used, preferably, such are mounted on a printed circuit board (PCB).

Preferably, the PCB is located between the first and second portions of the platform.

Alternatively, the PCB is located on at least part of an upper surface of the platform.

Preferably, the PCB is secured to the platform of the scooter or self-propelled vehicle. The PCB may be secured to the platform of the scooter or self-propelled vehicle by securing means such as glue, rivets, screws or any other suitable securing means.

The PCB may be covered in a coating such as epoxy, e.g. an epoxy resin. Epoxy may be provided to protect the PCB; however, such may be arranged such that the LEDs are still visible.

Alternatively or additionally, the PCB may be covered by opaque or translucent means, paper or card and arranged such that the light from the illumination means passes through the opaque or translucent means, paper or card or is visible through apertures in the opaque or translucent means, paper or card.

Preferably, the transparent or translucent part of the platform covers the LEDs.

Preferably, the transparent or translucent part of the platform is a polymeric material.

The transparent or translucent part of the platform may wrap around one or more of the edges of the first portion of the platform.

The illumination means may be provided/further provided along at least first and second regions of the platform. Preferably, the first and second regions of the platform are adjacent first and second sides of the platform. Preferably in use, a user may place his or her foot between said first and second regions.

The illumination means may define a closed shape upon a portion of the platform, e.g. defining where a user should place a foot, in use. Providing guidance for a user as to where to place a foot on the platform can assist the user in selecting optimum placement of their foot to ride upon the scooter or vehicle and/or execute a manoeuvre.

Preferably, the scooter or other self-propelled vehicle includes control means for the user to select a desired operation mode of the illumination means.

It is preferred that alternative visual effects can be selected and controlled by the control means.

Preferably, the control means comprises switch means. The control means may be programmed to operate in a number of modes such as off and on and optionally continuous, flashing, strobing, chaser, etc.

Preferably, the illumination means is powered by one or more batteries. Alternatively, the scooter includes a power generator such as a dynamo for powering the illumination means.

The control means may further include a vibration operated switch. A vibration operated switch may react to vibrations passing through the scooter, for example, as the scooter passes over a rough surface, or when the scooter receives an impact such as a user's foot landing on the platform, or when the scooter is struck e.g. off a surface, e.g. the ground, so as to activate the illumination means.

Alternatively or additionally, the control means includes a weight sensor. A weight sensor may react to a user standing on the scooter to activate the illumination means.

Once activated the illumination means may illuminate for a fixed period of time, for example, 5 seconds. The illumination means may therefore continue to operate until shortly after movement ceases.

Preferably, at least part of the circuitry of the PCB is located at one end of the PCB. Where the scooter is a collapsible scooter or micro-scooter, preferably, part of the circuitry of the PCB is located adjacent the hinge of the scooter. The hinge provides useful additional protection for the circuitry.

Preferably, where the scooter or other self-propelled vehicle is a scooter, such is a two-wheeled scooter. Alternatively, the scooter has three wheels, e.g. a single front wheel and two rear wheels. The rear wheels may be co-axial with one another.

There may be provided means for spacing the first portion from the second portion.

The spacing means may comprise a plurality of pillars extending from the second portion and beneficially integrally formed therewith.

According to a third aspect of the present invention there is provided a scooter or other self or foot propelled vehicle or the like having at least one illumination means, the illumination means being operable in response to a vibration or impact applied to the scooter or vehicle.

A vibration or impact can be a single or repetitive force applied to the scooter or the like, e.g. as the scooter travels over a surface, or it could be a single impact caused by the scooter landing on a surface after a manoeuvre has been performed, or an impact caused by a user mounting or striking the scooter or striking the scooter off a surface or other body.

According to a fourth aspect of the present invention there is provided a three wheeled collapsible scooter or micro-scooter.

According to a fifth aspect of the present invention there is provided a scooter, such as a three wheeled scooter, the scooter having at least two rear wheels, and further, including a rear brake.

The rear brake may comprise a brake member resiliently biased into a first position away from the rear wheels. Application of a force, e.g. from a foot of a user, may cause first and second portions of the brake member to frictionally engage respective first and second rear wheels.

According to a sixth aspect of the present invention there is provided a scooter having handlebars, the handlebars incorporating an illumination means such as a novelty lighting effect.

Preferably, the illumination means or novelty lighting effect is provided on at least one end, and preferably both ends of the handlebars.

Preferably, the illumination means or novelty lighting effect is provided by a self-contained battery operated unit.

Preferably, the illumination means comprises at least one LED.

BRIEF DESCRIPTION OF THE DRAWING

Embodiments of the present invention will now be described by way of example only and with reference to the accompanying figures, which are.

DETAILED DESCRIPTION OF THE PREFERRED EMBODIMENTS

Figure 1:
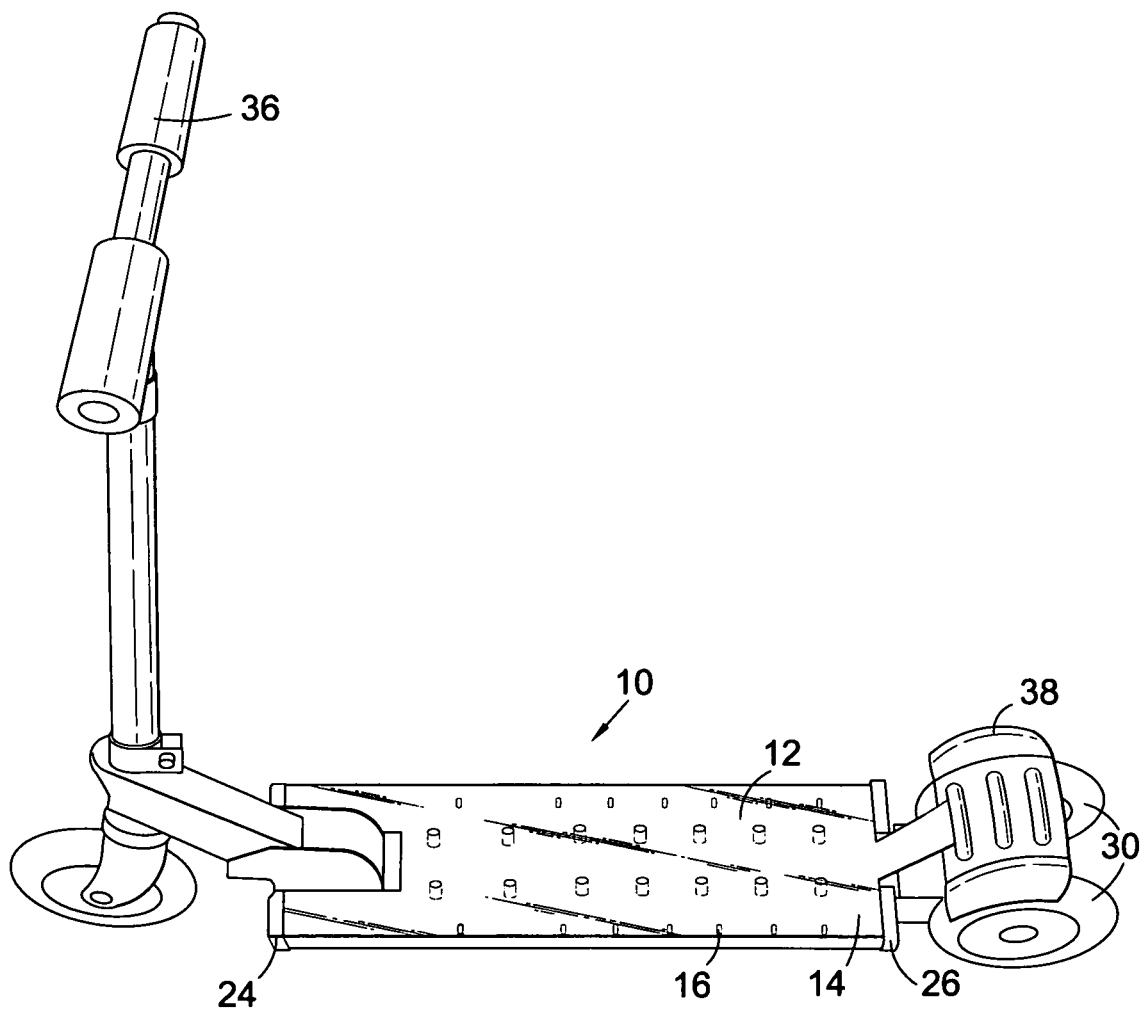
FIG. 1 is a perspective view from above and to one side of a scooter according to a first embodiment of the present invention.
Figure 2:
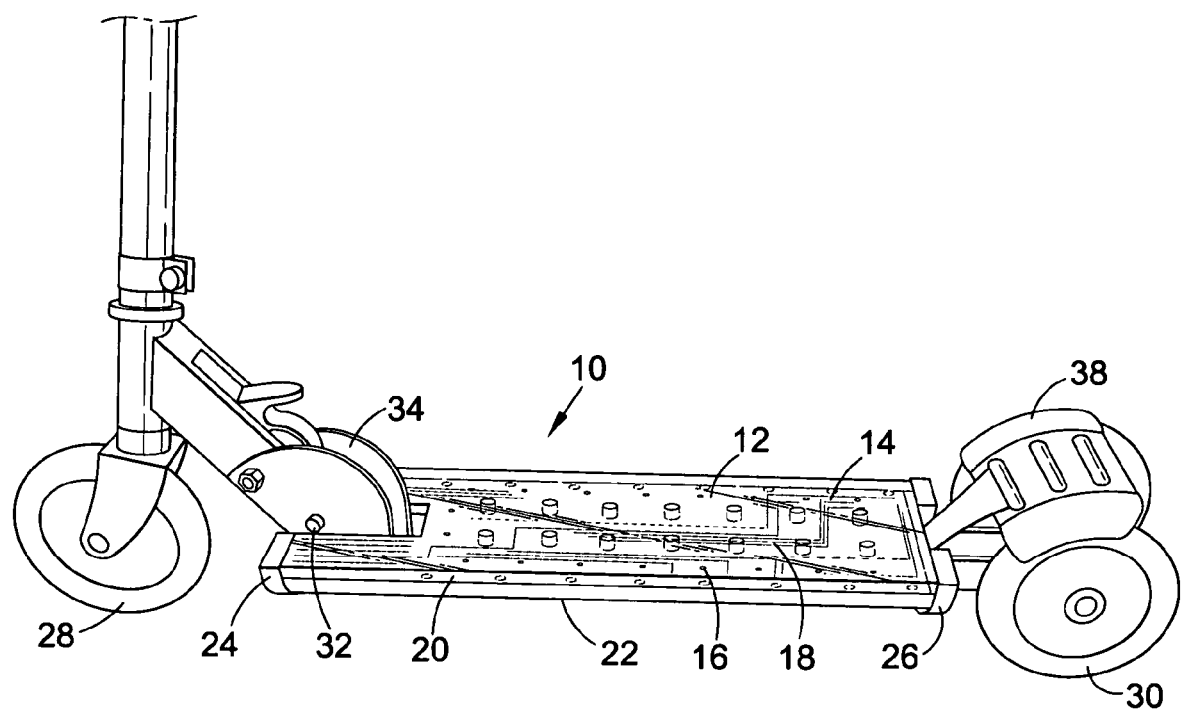
FIG. 2 is a partial perspective view from above and to one side of part of the scooter of FIG. 1.

Referring initially to FIGS. 1 and 2, there are shown perspective views of a scooter, generally designated 10, according to a first embodiment of the present invention. The scooter 10 includes a platform 12 having an upper surface 14, which in this embodiment is transparent—although such may be partly transparent or translucent.

The scooter 10 further includes illumination means 16 which are mounted to a printed circuit board (PCB) 18 housed within the platform 10.

The platform 12 comprises an upper portion 20 injection moulded from transparent plastic material, a lower portion 22 made from aluminium, and a first end cap 24 and a second end cap 26.

In this example, the scooter 10 is a collapsible micro-scooter having a single front wheel 28 and a pair of rear wheels 30, or in a modification, a single rear wheel. The micro-scooter 10 collapses around a pivot 32, supported by a bracket 34. The micro-scooter 10 also includes handlebars 36 (shown on FIG. 1) and a rear brake 38.

Figure 3:
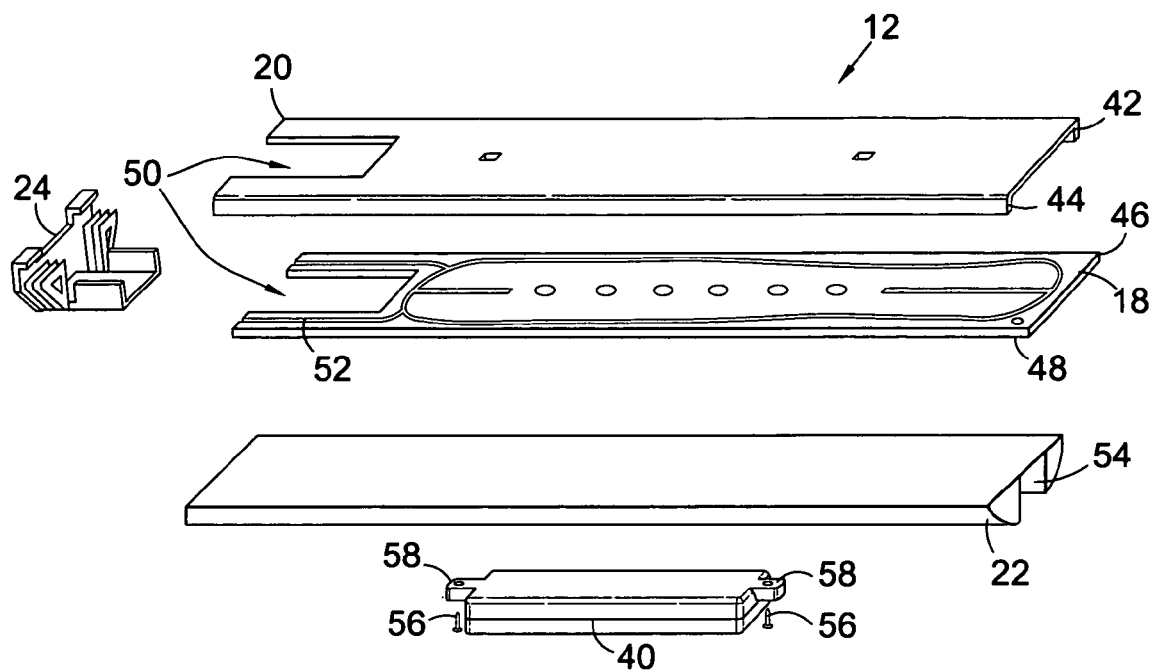
FIG. 3 is an exploded schematic view of part of a platform of the scooter FIG. 1.

Referring now to FIG. 3, there is shown an exploded schematic view of part of the platform 12 of the scooter 10. The PCB 18 is sandwiched between the upper portion 20 of the platform 12 and the lower portion 22 of the platform 12. It will also be noted that the upper portion 20 has downwardly depending sides 42, 44 which wrap around long sides 46, 48 of the PCB 18.

The upper platform portion 20 is secured to the lower platform portion 22 by means of the first end cap 24 and the second end cap (not shown for clarity).

The PCB 18 and the upper portion 20 include a cut-outs 50, 51, the purpose of which will be explained later.

The platform 12 further includes a control box 40 which includes batteries and circuitry (not shown) for controlling the illumination means 16. The control box 40 is connected to circuitry 52 on the PCB 18 by means of a wire or wires (not shown). The control box 40 is secured in a channel 54 defined by the lower portion 22 of the platform 12 by means of screws 56 which pass through brackets 58 on the control box 40. The control box 40 includes an on/off switch 41.

Figure 4:
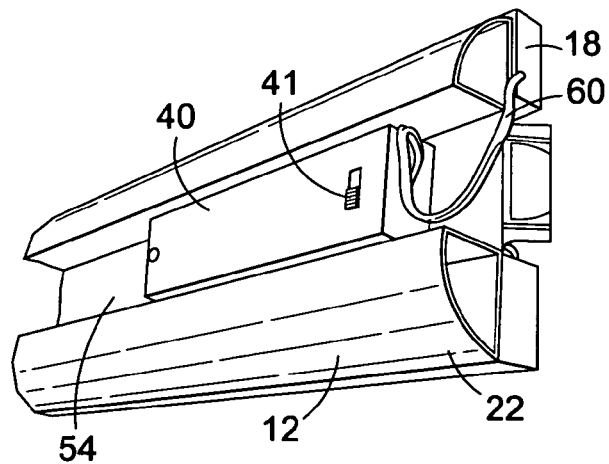
FIG. 4 is a perspective view of an underside of part of the platform of the scooter of FIG. 1.

The arrangement of an underside of a lower platform portion 22 can be seen in FIG. 4, which comprises a perspective view of an underside of part of the platform 12 of the scooter 10 of FIG. 1.

The control box 40 is shown positioned in the channel 54 defined by the lower portion 22 of the platform 12. The wire 60 which connects the control box to the PCB 18 can be clearly seen. For clarity, the first end cap 24 is not shown. The lower platform 22 is, in this embodiment, an extruded section of aluminium.

Figure 5:
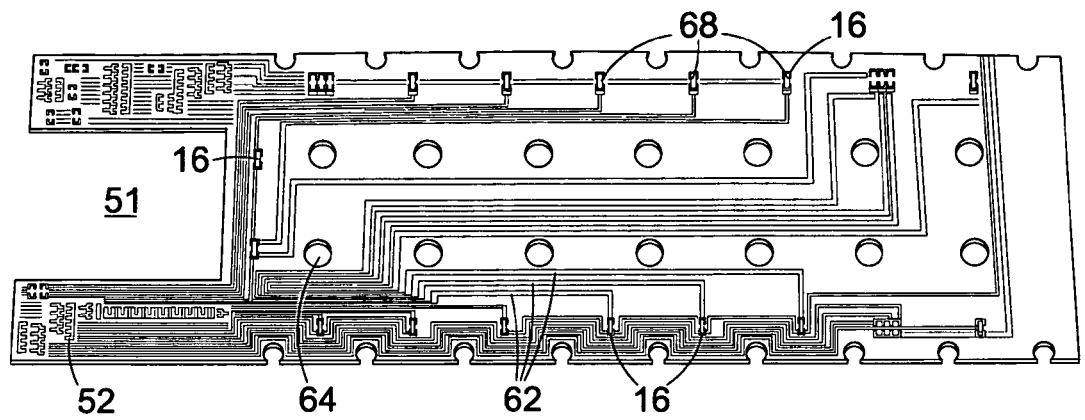
FIG. 5 is a top view of a printed circuit board of the scooter of FIG. 1.

Referring now to FIG. 5, there is shown a top view of the PCB 18 of the scooter 10. The control circuitry 52 of the PCB 18 can be seen adjacent the cut-out 50. Also included are a series of tracks 62, of which three are indicated, which transmit signals to the illumination means 16, of which four are indicated, in the form of surface mounted LEDs 68, of which three are indicated. The surface mounted LEDs 68, in this case are red and blue. It will, however, be appreciated that any available colour or colours may be provided.

The PCB 18 further includes a series of apertures 64. The purpose of these apertures 64 is discussed in connection with FIG. 6.

The control box 40 (shown in FIG. 4) and the circuitry 52 further include a vibration switch (not shown), which causes the illumination means 16 to flash, and/or strobe in response to a vibration being applied to the scooter 10.

Figure 6:
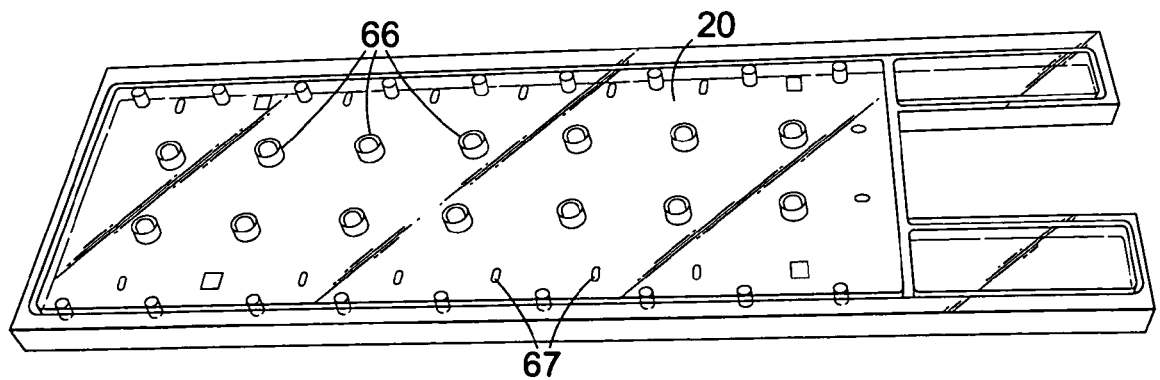
FIG. 6 is a perspective view of an upper portion of the platform of the scooter of FIG. 1.

Referring to FIG. 6, there is shown a perspective view of the transparent, or alternatively translucent, upper portion 20 of the platform 12 of the scooter 10 of FIG. 1. The upper portion 20 includes pillars 66 which, when the platform 12 is assembled, extend through the apertures 64 in the PCB and engage the lower portion 22. The purpose of these pillars 66 is to transfer the weight of a user onto the lower portion 22 of the platform 12 without damaging the PCB 18, which is sandwiched between the upper and lower platform portions 20, 22.

Figure 7:
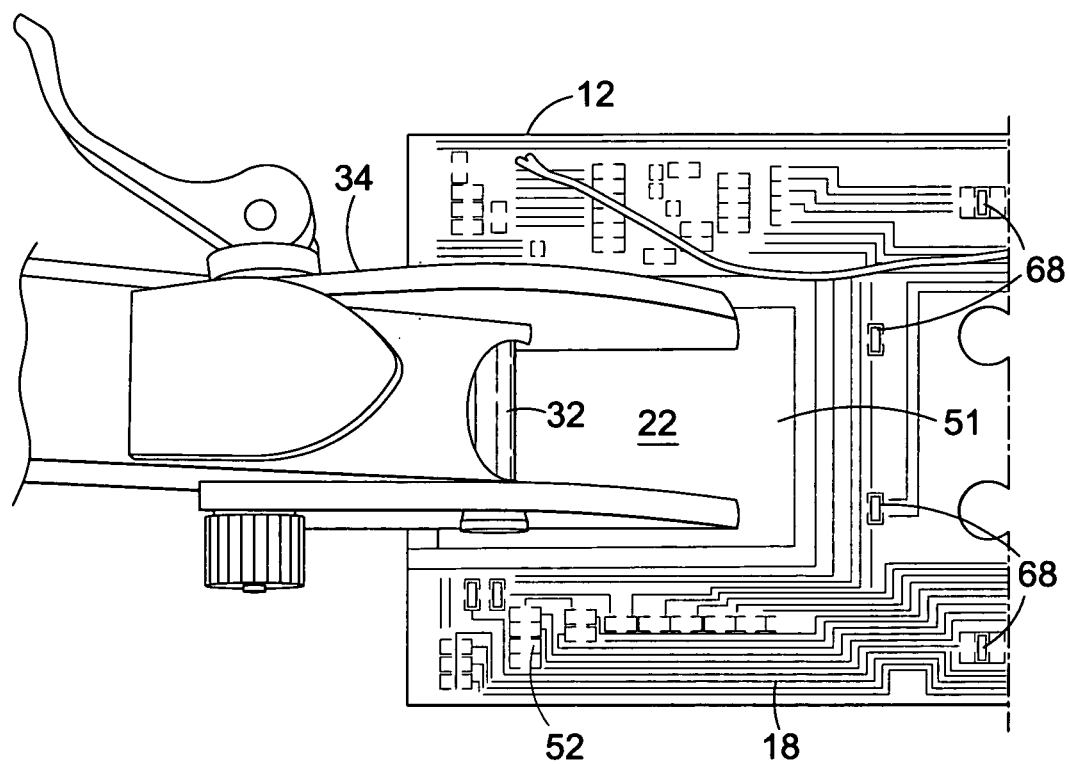
FIG. 7 is a close-up view from above of a hinge bracket and part of the printed circuit board of the scooter of FIG. 1.

Referring now to FIG. 7, there is shown a close-up top view of the hinge bracket 34 and part of the PCB 18 of the scooter 10 of FIG. 1. The circuitry 52 is located at either side of the cut-out 50 in the upper portion 20 of the platform 12 and the PCB 18. This cut-out 50 accommodates the hinge bracket 34 which supports the pivot 32. The hinge bracket 34 is welded to the lower portion 22 of the platform 12. This arrangement permits the circuitry 52 to be, at least to some degree, protected by the presence of the bracket 34, as the location of the bracket 34 acts to prevent a user's foot extending onto this part of the platform 12 and applying weight to the upper portion 20 in the vicinity of the circuitry 52, which may damage the circuitry 52.

Figure 8:
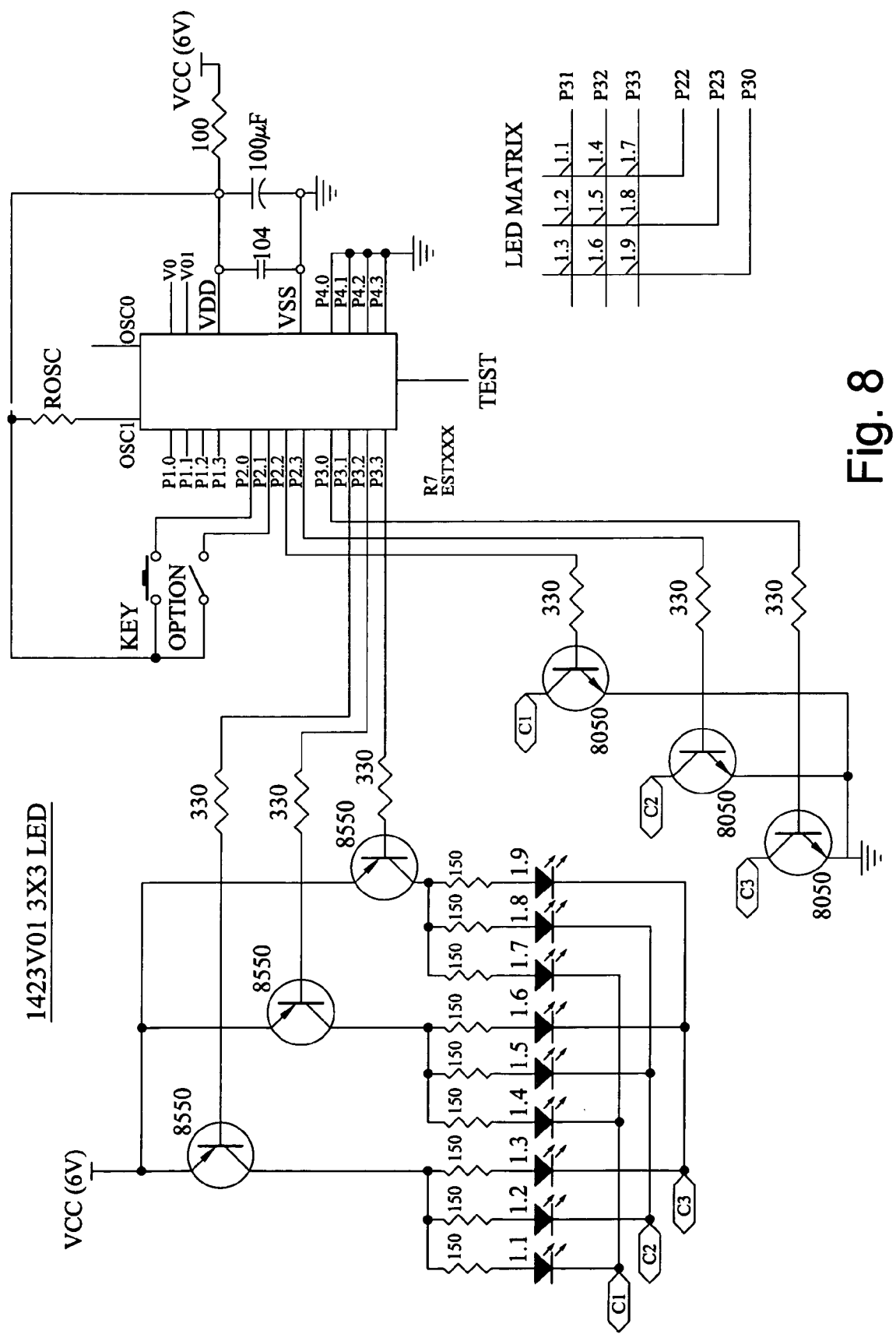
FIG. 8 is a circuit diagram for the printed circuit board of FIG. 5.
Figure 9:
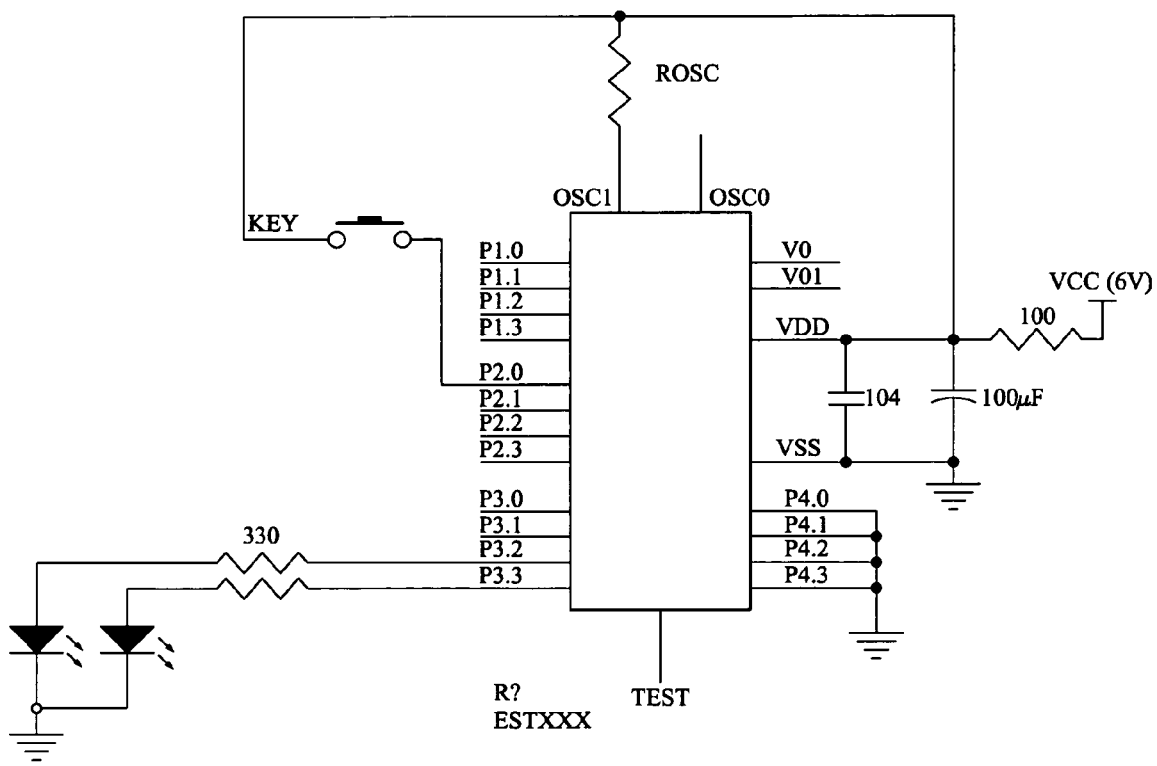
FIG. 9 is a further circuit diagram for the printed circuit board of FIG. 5.

FIGS. 8 and 9 show circuit diagrams for the PCB 18.

Figure 10:
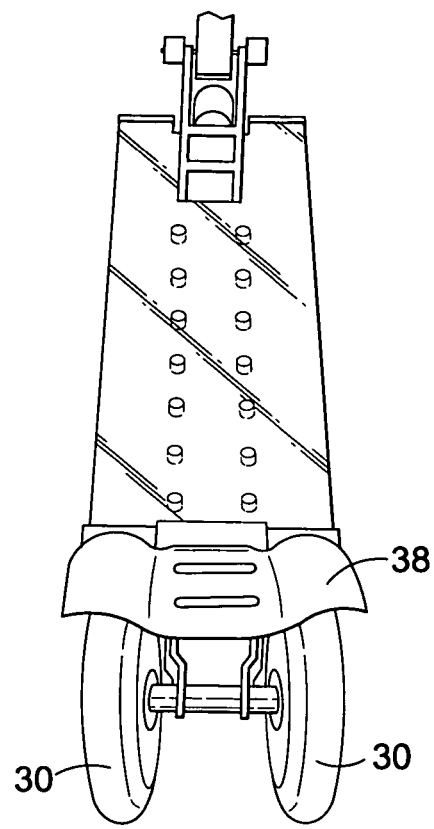
FIG. 10 is a rear view of part of the scooter of FIG. 1 showing a rear brake.

FIG. 10 shows a rear view of part of the scooter 10 of FIG. 1, and particularly shows the rear brake 38 and the rear wheels 30. As can be seen, the rear brake 38 is resiliently biased away from the rear wheels 30. However, in use, a force, may be applied e.g. via a foot of a user, to the brake 38 to cause first and second suitably shaped portions of the brake 38 to frictionally engage the rear wheels 30.

Figure 11:
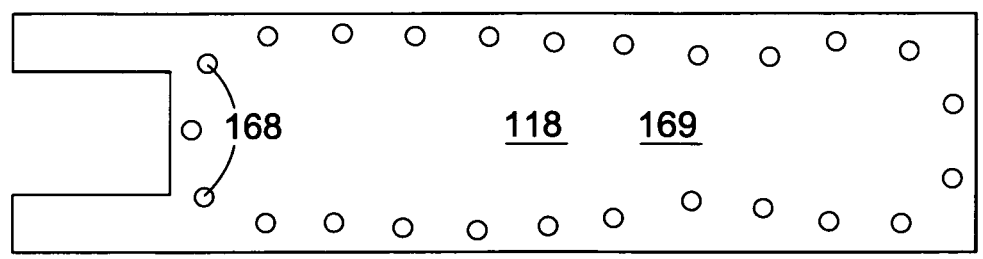
FIG. 11 is a schematic view of a printed circuit board having an alternative arrangement of LEDs according to a second embodiment of the present invention.

Referring now to FIG. 11, there is shown an alternative schematic of a printed circuit board 118 showing an alternative arrangement of LEDs 168 (of which two are indicated). This arrangement of LEDs 168 indicates a region 169 in which a user may beneficially choose to place their foot.

Figure 12:
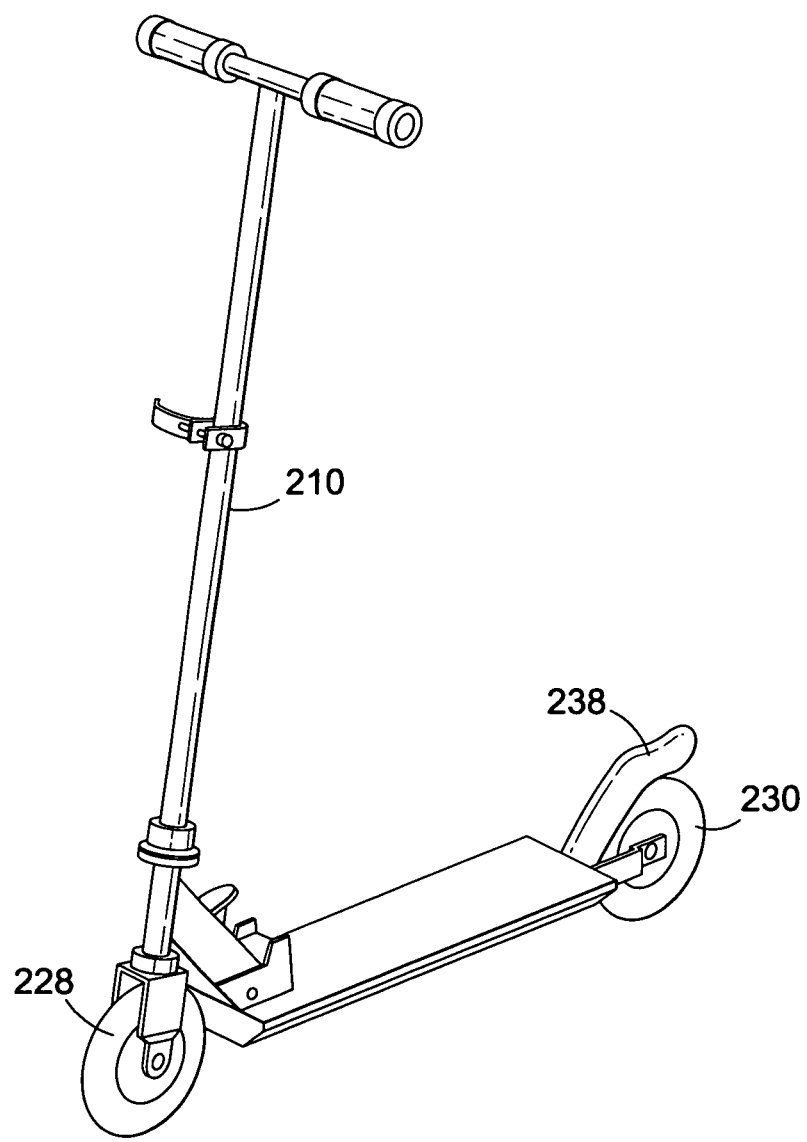
FIG. 12 is a perspective view of an alternative scooter according to a third embodiment of the present invention.

Finally, referring to FIG. 12, there is shown a perspective view of an alternative scooter 210 according to a third embodiment of the present invention. This scooter 210 is a two-wheel scooter having a front wheel 228 and a rear wheel 230 with a rear brake 238. The scooter 210 may be substantially the same as the scooter 10,110 of the first and second embodiments, particularly regarding the provision of illumination means (not shown) and in the construction of the platform.

It will be understood that the foregoing embodiments of the present invention are given for illustrative purposes only, and that various modifications and improvements may be made to the scooter described herein without departing from the scope of the invention. For example, although the platform of the first embodiment is in part transparent, it could be in part translucent to defuse the light from the surface mounted LEDs and provide a different visual effect.

Similarly, the surface mounted LEDs can be of any colour or a combination of different colours and the vibration switch could alternatively or additionally be a weight sensor.

It will be appreciated that the preferred embodiments of the scooters hereinbefore described are advantageously collapsible "micro-scooters." However, it will be appreciated that the lighting effect described may be provided on other types of scooters, e.g. non-collapsible scooters, or alternatively skateboards or other foot propelled vehicles having a platform or deck and two or more wheels.

What is claimed is:

1. A foot-propelled vehicle comprising a scooter comprising front and rear wheels and a steering column and a platform for supporting a user, the platform having an upper surface and at least one illumination element disposed to provide light through the upper surface, wherein the platform comprises a lower platform portion formed of a first material and a substantially continuous planar upper platform portion formed of a second material, the upper platform portion providing said upper surface of the platform, said upper surface of the platform comprising a footplate, the first material comprising a metallic material, the second material comprising a rigid moulded polymeric material being at least part transparent or translucent, and wherein the at least one illumination element has a planar configuration and extends parallel to and between an upper planar surface of the lower platform portion and the upper platform portion.

2. The foot-propelled vehicle of claim 1, wherein the foot-propelled vehicle is a micro-scooter.

3. The foot-propelled vehicle of claim 1, wherein the foot-propelled vehicle is collapsible.

4. The foot-propelled vehicle of claim 1, further comprising a handle.

5. The foot-propelled vehicle of claim 4, wherein the handle is collapsible.

6. The foot-propelled vehicle of claim 1, wherein at the lower platform portion is formed from an extruded metal.

7. The foot-propelled vehicle of claim 6, wherein the extruded metal is substantially aluminum or an alloy thereof.

8. The foot-propelled vehicle of claim 1, wherein the lower platform portion is coupled to the upper platform portion.

9. The foot-propelled vehicle of claim 1, wherein the metallic material is an extruded metallic material.

10. The foot-propelled vehicle of claim 8, wherein the platform further includes end caps that secure the lower platform portion and the upper platform portion together.

11. The foot-propelled vehicle of claim 8, wherein the upper platform portion wraps around one or more edges of the lower platform portion.

12. The foot-propelled vehicle of claim 8, wherein the lower platform portion and the upper platform portion are at least partially spaced from one another.

13. The foot-propelled vehicle of claim 8, wherein the lower platform portion and the upper platform portion are at least partially spaced from one another by a plurality of pillars extending from the upper platform portion.

14. The foot-propelled vehicle of claim 1, wherein the at least one illumination element is provided within the platform.

15. The foot-propelled vehicle of claim 1, wherein the at least one illumination element comprises a plurality of light emitting diodes.

16. The foot-propelled vehicle of claim 15, wherein the at least one illumination element provides light in at least one color selected from the group consisting of red, blue, green, yellow, white, purple, pink, gold, turquoise, and orange.

17. The foot-propelled vehicle of claim 15, wherein the light emitting diodes are surface mounted display light emitting diodes mounted on a printed circuit board.

18. The foot-propelled vehicle of claim 17, wherein the printed circuit board is located between the lower platform portion and the upper platform portion.

19. The foot-propelled vehicle of claim 17, wherein the printed circuit board is secured to the platform.

20. The foot-propelled vehicle of claim 17, wherein the printed circuit board is covered in a coating of epoxy resin.

21. The foot-propelled vehicle of claim 17, wherein the light emitting diodes are located between a cover and the printed circuit board, and wherein the cover is formed of a cover material selected from the group consisting of an at least partially transparent material and an at least partially translucent material.

22. The foot-propelled vehicle of claim 21, wherein the cover material comprises paper or card.

23. The foot-propelled vehicle of claim 21, wherein the light emitting diodes are disposed proximate apertures in the cover.

24. The foot-propelled vehicle of claim 17, wherein the upper platform portion covers light emitting diodes.

25. The foot-propelled vehicle of claim 17, wherein circuitry of the printed circuit board is located at an end of the printed circuit board adjacent at least one side of a hinge of the foot-propelled vehicle.

26. The foot-propelled vehicle of claim 1, wherein the at least one illumination element is further provided along at least first and second regions of the platform, the first and second regions of the platform being adjacent first and second sides of the platform.

27. The foot-propelled vehicle of claim 1, wherein the at least one illumination element defines a closed shape on the platform.

28. The foot-propelled vehicle of claim 1, wherein the at least one illumination element defines a closed shape upon a portion of the platform portion where the user places a foot in use.

29. The foot-propelled vehicle of claim 1, further comprising a control for selecting a desired operation mode of the at least one illumination element.

30. The foot-propelled vehicle of claim 29, wherein the control comprises a switch for switching to an operation mode selected from the group consisting of off, on, continuous, flashing, strobing, and chaser.

31. The foot-propelled vehicle of claim 29, wherein the at least one illumination element is powered by at least one battery.

32. The foot-propelled vehicle of claim 29, wherein the control comprises a vibration operated switch.

33. The foot-propelled vehicle of claim 29, wherein the control comprises a weight sensor.

34. The foot-propelled vehicle of claim 29, wherein the control activates the at least one illumination element to provide light for a fixed period of time in at least one operation mode.

35. The foot-propelled vehicle of claim 1, wherein the foot-propelled vehicle is a three-wheeled scooter having a single front wheel and two rear wheels, the rear wheels being co-axial with one another.

36. The foot-propelled vehicle of claim 1, wherein the at least one illumination element is operable in response to a vibration applied to the foot-propelled vehicle.

37. The foot-propelled vehicle of claim 1, wherein the at least one illumination element is operable in response to an impact applied to the foot-propelled vehicle.

38. The foot-propelled vehicle of claim 1, further comprising first and second rear wheels and a rear brake.

39. The foot-propelled vehicle of claim 38, wherein the rear brake comprises a brake member resiliently biased into a first position away from the rear wheels, and wherein application of a force from a foot of a user causes a first portion of the brake member to frictionally engage the second rear wheel.

40. The foot-propelled vehicle of claim 1, further comprising handlebars incorporating at least one lighting element.

41. The foot-propelled vehicle of claim 40, wherein the at least one lighting element is provided proximate at least one end of the handlebars.

42. The foot-propelled vehicle of claim 40, further comprises a self-contained battery operated unit.

43. The foot-propelled vehicle of claim 40, wherein the at least one lighting element comprises at least one light emitting diode.

44. The foot-propelled vehicle of claim 1, wherein the self propelled vehicle comprises handlebars.

45. A foot-propelled vehicle as claimed in claim 1, wherein the upper platform portion extends across a width of the platform.

46. The foot-propelled vehicle of claim 1, wherein each of the upper platform portion, lower platform portion, and illumination element are releasably connected to one another.

47. The foot-propelled vehicle of claim 1, wherein the lower platform portion includes the upper planar surface facing a lower surface of the upper platform portion, wherein the upper planar surface of the lower platform portion is free of recesses, the at least one illumination element overlying the upper surface of the lower platform portion.

48. The foot-propelled vehicle of claim 1, wherein the at least one illumination element is provided on a printed circuit board having substantially the same size and shape as the upper platform portion.

49. The foot-propelled vehicle of claim 1, wherein the at least one illumination element is provided on a printed circuit board that, along with the upper platform portion and lower platform portion, form discrete layers of the foot-propelled vehicle.

50. The foot-propelled vehicle of claim 1, wherein the lower platform portion includes a planar upper surface.

51. The foot-propelled vehicle of claim 1, wherein both the upper platform portion and lower platform portion are exposed when the upper platform portion is connected to the lower platform portion.

52. A foot-propelled vehicle comprising a scooter comprising front and rear wheels and a steering column and a platform for supporting a user, the platform having an upper surface and at least one illumination element disposed to provide light through the upper surface, wherein the platform comprises a lower platform portion and a substantially continuous planar upper platform portion at least partially spaced from the lower platform portion to define empty space between the upper platform portion and lower platform portion when the foot-propelled vehicle is assembled, the upper platform portion providing said upper surface of the platform, said upper surface of the platform comprising a footplate, the upper platform portion comprising a rigid moulded polymeric material being at least part transparent or translucent, and wherein the at least one illumination element has a planar configuration and extends parallel to and between an upper planar surface of the lower platform portion and the upper platform portion.

53. The foot-propelled vehicle of claim 52, wherein the lower platform portion includes the upper planar surface facing a lower surface of the upper platform portion, wherein the upper planar surface of the lower platform portion is free of recesses, the at least one illumination element overlying the upper surface of the lower platform portion.

54. The foot-propelled vehicle of claim 52, wherein the at least one illumination element is provided on a printed circuit board having substantially the same size and shape as the upper platform portion.

55. The foot-propelled vehicle of claim 52, wherein the at least one illumination element is provided on a printed circuit board that, along with the upper platform portion and lower platform portion, form discrete layers of the foot-propelled vehicle.

56. The foot-propelled vehicle of claim 52, wherein the lower platform portion includes a planar upper surface, the at least one illumination element having a planar configuration and extending parallel to the upper surface of the lower platform portion and the upper surface of the platform.

57. The foot-propelled vehicle of claim 52, wherein both the upper platform portion and lower platform portion are exposed when the upper platform portion is connected to the lower platform portion.

58. A foot-propelled vehicle comprising a scooter comprising front and rear wheels and a steering column and a platform for supporting a user, the platform having an upper surface and at least one illumination element disposed to provide light through the upper surface, wherein the platform comprises a lower platform portion formed of a first material and an upper platform portion formed of a second material different from the first material, the upper platform portion providing said upper surface, the upper platform portion comprising a moulded polymeric material being at least part transparent or translucent, the upper surface of the platform comprising a footplate, wherein the illumination element is located between the upper and lower platform portions, and wherein the lower platform portion and upper platform portion are at least partially spaced from one another by a plurality of spacers extending from the upper platform portion.

59. The foot-propelled vehicle of claim 58, wherein the spacers extend through at least one or a plurality of apertures of the illumination element and engage the lower platform portion.

60. The foot-propelled vehicle of claim 58, wherein the lower platform portion is coupled to the upper platform portion, with the lower platform being formed of a metallic material and the upper platform being formed of the at least partially transparent or translucent material.

61. The foot-propelled vehicle of claim 58, wherein the spacers comprise a plurality of pillars extending from the upper platform portion.

62. The foot-propelled vehicle of claim 58, wherein the at least one illumination element is provided within the platform.

63. The foot-propelled vehicle of claim 58, wherein the at least one illumination element comprises a plurality of light emitting diodes.

64. The foot-propelled vehicle of claim 63, wherein the light emitting diodes are surface mounted display light emitting diodes mounted on a printed circuit board.

65. The foot-propelled vehicle of claim 64, wherein the printed circuit board is located between the lower platform portion and the upper platform portion.

66. The foot-propelled vehicle of claim 65, wherein the printed circuit board is secured to the platform.

67. The foot-propelled vehicle of claim 65, wherein the upper platform portion covers light emitting diodes.

68. The foot-propelled vehicle of claim 65, wherein circuitry of the printed circuit board is located at an end of the printed circuit board adjacent at least one side of a hinge of the foot-propelled vehicle.

69. The foot-propelled vehicle of claim 58, wherein the at least one illumination element is further provided along at least first and second regions of the platform, the first and second regions of the platform being adjacent first and second sides of the platform.

70. The foot-propelled vehicle of claim 58, wherein each of the upper platform portion, lower platform portion, and illumination element are releasably connected to one another.

71. The foot-propelled vehicle of claim 58, wherein the lower platform portion includes an upper surface facing a lower surface of the upper platform portion, wherein the upper surface of the lower platform portion is free of recesses, the at least one illumination element overlying the upper surface of the lower platform portion.

72. The foot-propelled vehicle of claim 58, wherein the at least one illumination element is provided on a printed circuit board that, along with the upper platform portion and lower platform portion, form discrete layers of the foot-propelled vehicle.

73. The foot-propelled vehicle of claim 58, wherein the lower platform portion includes a planar upper surface, the at least one illumination element having a planar configuration and extending parallel to the upper surface of the lower platform portion and the upper surface of the platform.

* * * * *